Oct. 24, 1933.                C. A. BROWN                1,931,569
                         GRASS AND HEDGE TRIMMER
                         Filed Oct. 4, 1932        3 Sheets-Sheet 2
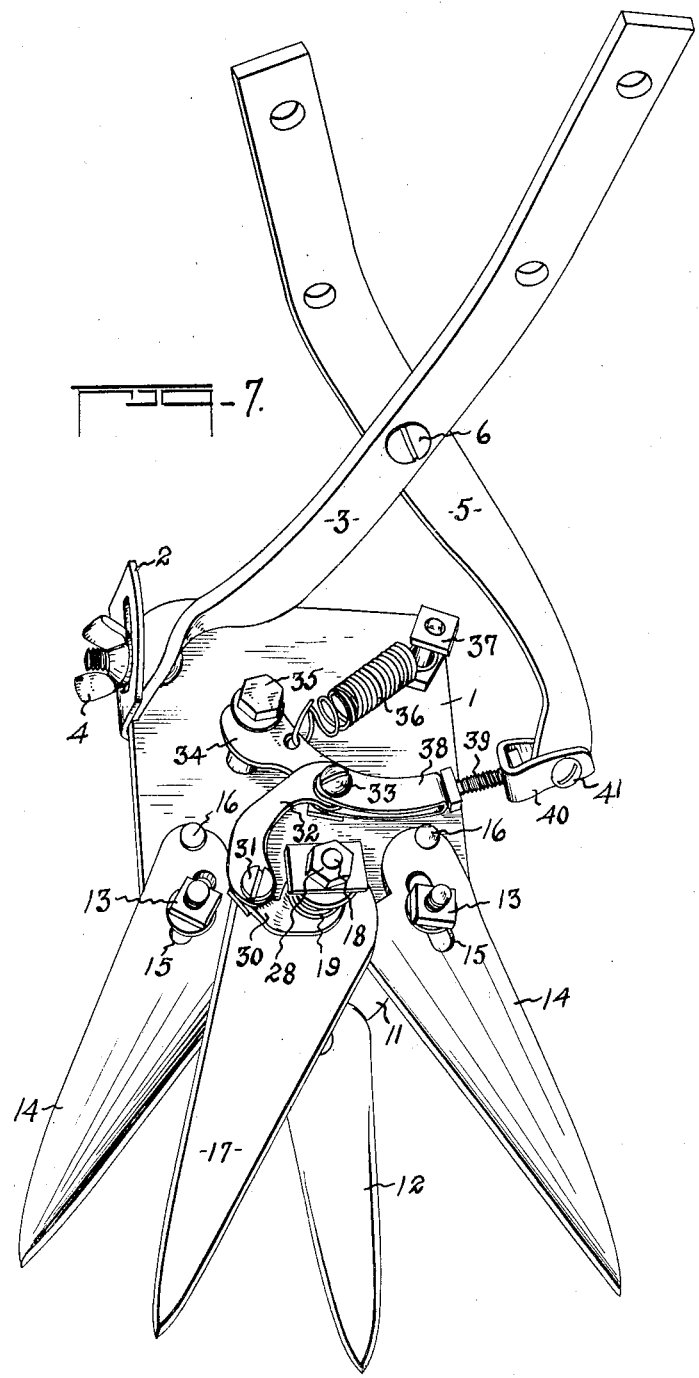
INVENTOR-
Chester A. Brown.
BY Danby & Danby
ATTORNEY-S.

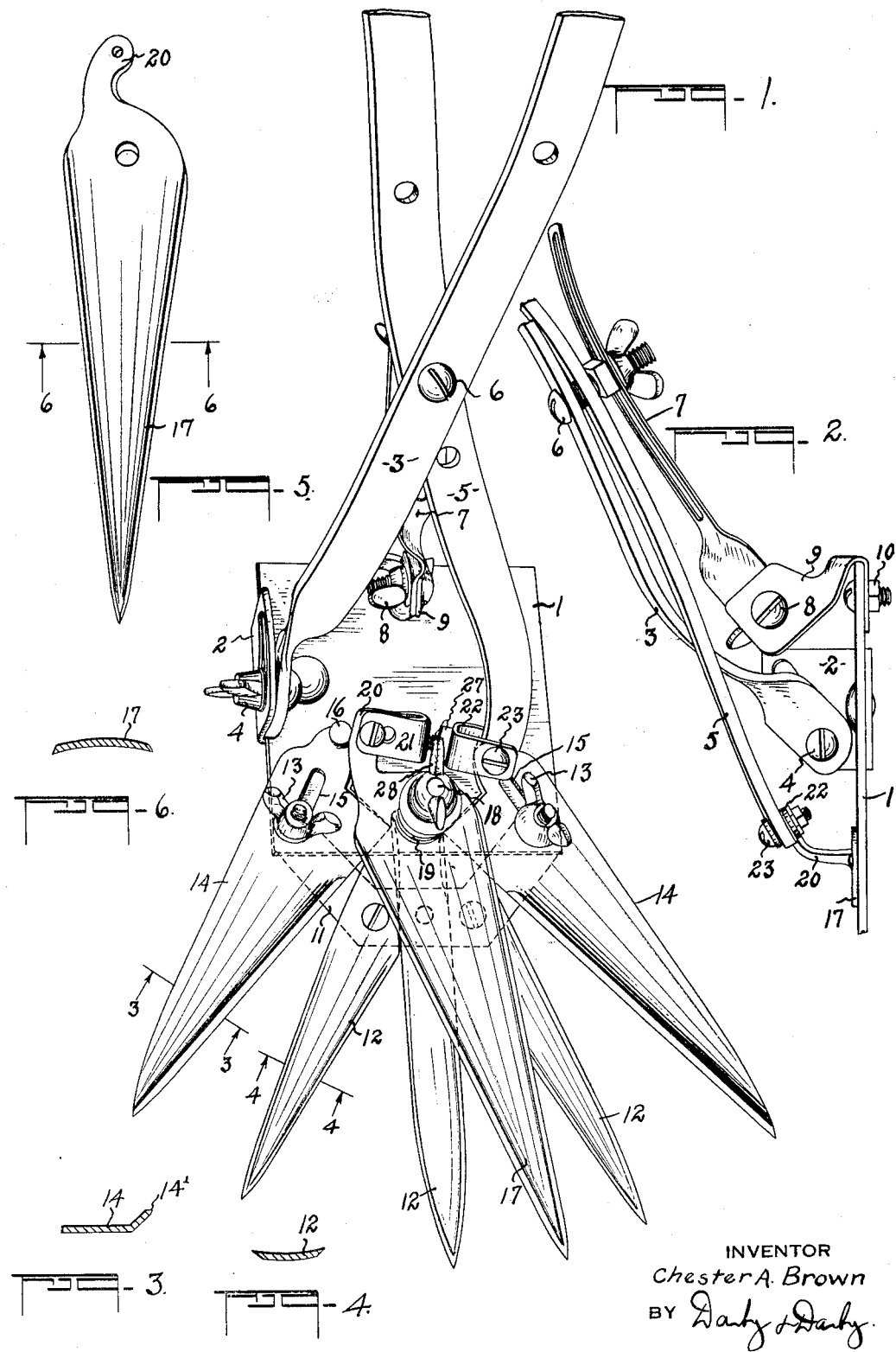

Oct. 24, 1933.   C. A. BROWN   1,931,569
GRASS AND HEDGE TRIMMER
Filed Oct. 4, 1932   3 Sheets-Sheet 3
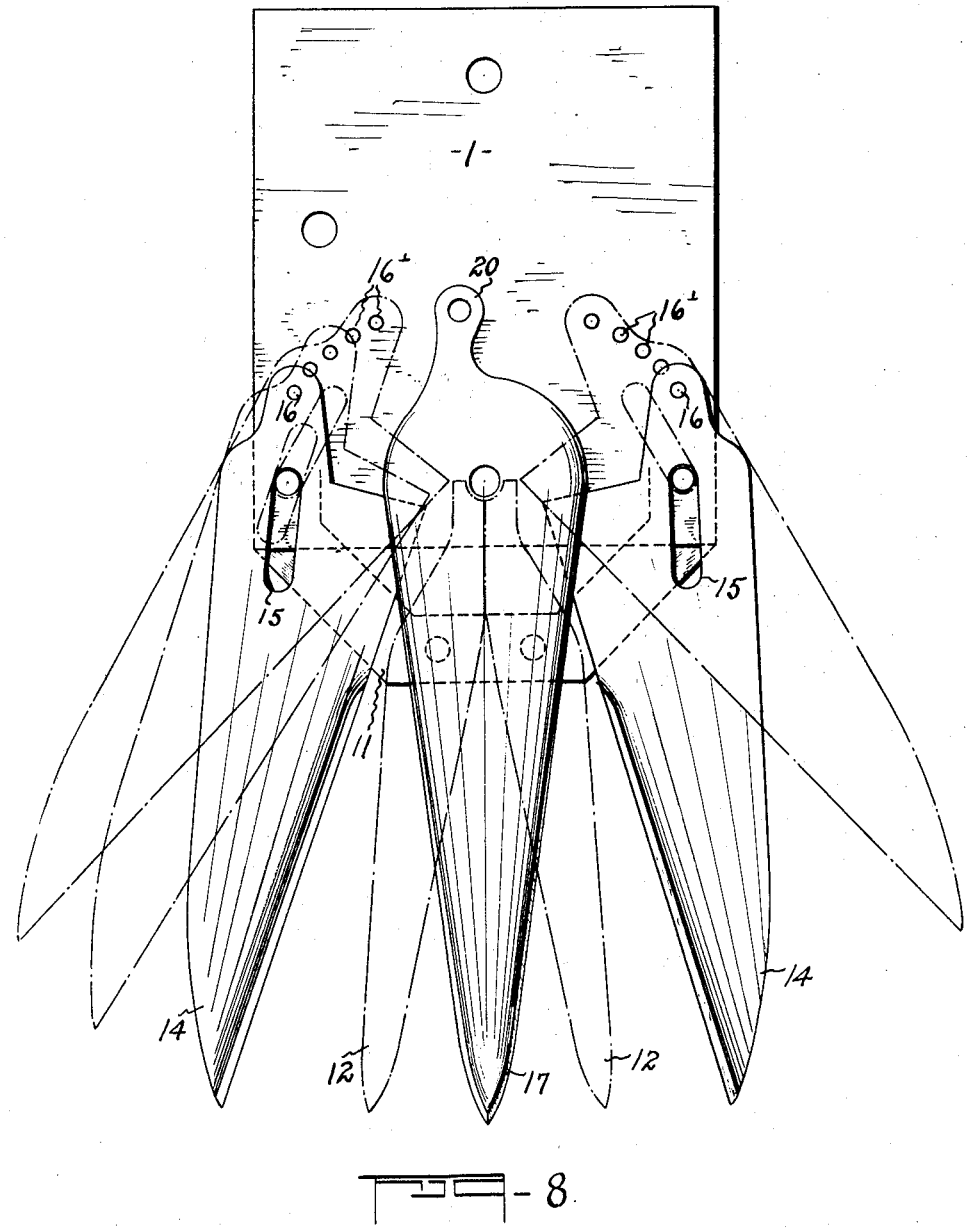
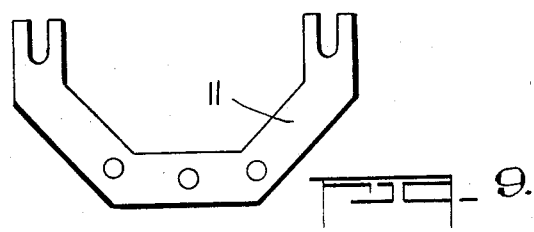
INVENTOR
Chester A. Brown.
BY
ATTORNEYS.

Patented Oct. 24, 1933

1,931,569

UNITED STATES PATENT OFFICE 1,931,569

GRASS AND HEDGE TRIMMER

Chester A. Brown, Newburgh, N. Y.

Application October 4, 1932. Serial No. 636,108

14 Claims. (Cl. 30—11)

This invention relates to improvements in grass and hedge trimmers, particularly of the type which is hand operated.

One of the objects of this invention is to provide a grass and hedge trimmer which may be readily adapted for various widths of cut.

A further object of the invention is to provide a device of this type in which the manually operated handles may be adjusted at various angles with respect to the plane of the cutting blades so that the tool may be readily used on the level, on down grades, and at various angles with respect to hedge surfaces.

A still further object of the invention is to provide in such a device a plurality of fixed cutting blades and one movable cutting blade operable over the surface thereof.

A still further object is to provide in such a structure an arrangement whereby the number of fixed blades may be reduced to two and these blades angularly adjusted with respect to each other to vary the width of the cut of the device.

A further object of this invention is to provide a tool of this type in which the movable blade makes two complete oscillations with respect to the fixed blades for one movement of the operating handles in either direction.

These and many other objects, as will appear from the following disclosure, are secured by means of this invention.

This invention resides substantially in the combination, construction, arrangement, and relative location of parts, all as will be described in the following specification and pointed out in the appended claims.

Referring to the drawings—

Figure 1 is a perspective view of one form of the device of this invention showing a portion of the operating handles broken away;

Fig. 2 is a side elevational view of a portion of this device showing the attachment of the handles to the supporting plate and their manner of angular adjustment with respect thereto;

Fig. 3 is a cross-sectional view on the line 3—3 of Fig. 1;

Fig. 4 is a cross-sectional view on the line 4—4 of Fig. 1;

Fig. 5 is a top plan view of the movable blade;

Fig. 6 is a cross-sectional view taken on the line 6—6 of Fig. 5;

Fig. 7 is a perspective view of a modified form of tool in which the oscillating blade performs two complete oscillations for one movement of the operating handles;

Fig. 8 is an enlarged detail view of the device showing how some of the fixed blades may be removed and the movable blades varied in angular position with respect to each other to vary the width of cut made by the tool; and Fig. 9 is a top plan view of the removable bracket to which the center blades are attached.

Referring to the drawings in detail, there is shown in Fig. 1 one form of the device of this invention. A supporting plate 1 is provided at one side with an ear or bracket permanently attached thereto and having an arcuate slot thereon. One of the operating handles 3 is adjustably connected to the ear 2 by means of a bolt and wing nut 4. The other operating handle 5 is pivotally connected to the operating handle 3 by means of a bolt and wing nut 6. A slotted arm 7 adjustably engages the bolt and wing nut 6 and is pivotally connected by another bolt and wing nut 8 to a second ear or lug 9 which is secured to the support 1 by means of a nut and bolt 10. At 11 is a removable plate or bracket to which is permanently secured a plurality of fixed cutting blades 12. The number of these blades may be varied, depending upon the requirements of the tool. The bracket 11 is notched on the ends, as indicated in Fig. 8, so as to slide over the bolts which cooperate with the wing nuts 13 by means of which the bracket is secured to the supporting plate 1. The outside fixed blades 14 are slotted, as indicated at 15, at a point so that the bolts and the wing nuts 13 may pass therethrough. The blades 14 are provided with extensions which have pins 16 therein which engage with one of a series of holes 16' in the supporting plate 1. With this simple construction it will be apparent that by means of the two wing nuts 13 all of the fixed blades may be secured in place and the three central fixed blades may be removed by simply loosening the wing nuts. As is apparent, the number of fixed blades on the bracket 11 may vary from one to as many as desired.

Referring to Fig. 8, the manner of angularly adjusting the outer fixed blades 14 will be apparent. The pins 16 on the extensions of the blades may engage any one of the series of holes 16' as the blades are oscillated about their securing bolts. Thus, as will be apparent from Fig. 8, the width of cut of the tool may be varied at will. As indicated in this figure, the removable bracket or supporting bar 11 may have only two fixed blades on which they are movable with the bracket as a unit by loosening the wing nuts 13.

Mounted on the plate is a pivoted bolt or pin 18 on which is oscillatably mounted the movable blade 17. This blade is resiliently held against the fixed blades by means of a spring 19 and adjusting wing nut 28. The blade 17 has an extension 20 which is pivotally connected to a clip 21. A similar clip 22 is pivotally connected by the bolt 23 to the lower end of the operating handle 5. The two clips 21 and 22 are adjustably connected by means of a bolt and lock nut 27 so that the clips may be longitudinally moved and adjusted with respect to each other.

The handles 3 and 5 are shown broken away but they are of course of the desired length, depending upon the particular requirements of the tool. For hedge trimming they could be short and for grass trimming they would be long enough so that the operator could stand substantially erect in operating the device. Likewise the handles could be made in detachable sections to adapt the tool for either use.

Fig. 3 is a cross-sectional view of the fixed blades 14 somewhat exaggerated to show how the cutting edge 14' is slightly raised above the plane of the blade. The fixed blades 12 are preferably transversely curved, as indicated in Fig. 4, and all of the blades are slightly curved longitudinally in accordance with the usual practice in this art, which features of construction in connection with the spring 19 cause the movable blade to move over the fixed blades with the proper shearing action.

In the operation of this device the upper ends of the handles 3 and 5 are merely moved towards and away from each other so that they oscillate about the pivot bolt 6. As a result, the lower end of arm 5 oscillates back and forth and through its movement causes the movable blade 17 to cooperate with the fixed blades to provide shearing action.

By reason of the method of connecting the handles to the supporting plate it is possible to vary their position from a vertical position to a position substantially in the plane of the supporting plate. To accomplish this, wing nuts 4 and 8 are loosened, as well as the wing nut on bolt 6, and the arms may then be moved angularly to any desired position with respect to the supporting plate. When properly adjusted these wing nuts are all tightened to hold the parts in adjusted relation. An advantage of this is that the operator may trim on the level, down an incline, or, in the case of trimming a hedge, may adjust the tool so that it will be in convenient operating position. It should be noted that the connection between the clips 21 and 22 is a swivel connection which permits of this angular adjustment without straining the parts.

The modified form of device shown in Fig. 7 is characterized by the fact that for a single movement of the operating handles 3 and 5 either towards or away from each other the movable blade makes two complete oscillations over the fixed blades. In this modified form of device the construction of the parts 1, 2, 3, 4, 5, 6, 11, 12, 13, 14, 15, and 16 is substantially the same as before. It will be noted, however, that the strengthening and bracing parts 7, 8, 9, and 10 are eliminated.

The movable blade 17 is oscillatably supported on the pivot pin 18 and locked in place by the nut 28 and resiliently urged against the fixed blades by means of the spring 19. A short arm 30, however, is secured to this blade, as shown, and is pivotally connected by the bolt 31 to a link 32, which in turn is pivotally connected by means of the bolt 33 to an arm 34 pivotally mounted on the plate 1 by the pivot pin 35. A coiled spring 36 connects the lever arm 34 with a fixed pin 37. The spring 36, although not necessary, is employed to aid the movement of the parts when the upper ends of the operating arms are being separated, which is a more tiring action on the operator's arms than that of moving them towards each other. A U-shaped clip 38 is connected to the pivot 33 and is, in turn, adjustably connected by means of the nut 39 to a clip 40 which is pivotally attached at 41 to the lower end of arm 5.

By properly proportioning and positioning the movable blade 17, the arm 30, link 32, lever arm 34, clip 38, bolt 39, and clip 40 with respect to each other the movable blade 17 will undergo two complete oscillations for one movement of the operating handles 3 and 5 either towards or away from each other. With the upper ends of the handles 3 and 5 close together, and the lower ends close together, the lever arm 34 will be to the left of the pivot pin and blade 17 will be at the extreme left. As the upper ends of the operating handles 3 and 5 separate the lower end of arm 5 will move to the right, drawing lever arm 34 with it.

Thus, for the first part of the movement of lever arm 34 the blade 17 will move to the right until the pivotal connection 33 passes the center line between the pivot pins 35 and 18, at which time the movable blade will be at the extreme right. Continued outward movement of the lower end of arm 5, and continued movement of lever arm 34 to the right, will then cause the movable blade 17 to return to the left.

From the above description it will be apparent that this invention resides in certain principles of construction and operation which may be embodied in other physical forms of apparatus without departure from this invention. I do not, therefore, desire to be strictly limited to the disclosure as given for purposes of illustration but rather to the scope of the appended claims.

What I seek to secure by United States Letters Patent is:

1. A trimmer as described comprising a supporting plate, a plurality of angularly adjustable blades mounted on said plate, a movable blade pivotally mounted on the plate so as to move over the blades on said plate, a pair of operating handles pivotally secured to said plate, and means for connecting the movable blade to the lower end of one of said handles.

2. A trimmer as described comprising a supporting plate, a plurality of blades on said plate adjustable towards and away from each other, a movable blade pivotally mounted on the plate so as to move over the blades on the plate, a pair of operating handles pivotally secured to said plate, and swivel means for connecting the movable blade to the lower end of one of said handles.

3. A trimmer as described comprising a supporting plate, a pair of angularly adjustable fixed blades mounted on said plate, a movable blade pivotally mounted on said plate and movable over the fixed blades, a pair of operating handles pivotally connected together, means for adjustably connecting the lower end of one of said handles to the plate, and adjustable means for connecting the free lower end of the other handle to the movable blade.

4. A trimmer as described comprising a supporting body, a plurality of fixed blades detachably secured to the body, a pair of outer fixed blades angularly adjustable on the body, a movable blade pivotally mounted on the body, a pair of arms pivotally secured together, means for adjustably connecting the lower end of one arm to the body, means for attaching the lower end of the other arm to the movable blade, and an adjustable bracing means secured to the body and engaging the pivot pin of the arms.

5. A trimmer as described comprising a supporting body, a pair of fixed cutting blades, means for securing the cutting blades to the body in any one of a number of desired angular positions with respect to each other, a movable blade pivotally mounted on the body, and a pair of operating arms pivotally connected together and secured to the body and the movable blade.

6. A trimmer as described comprising a supporting body, a pair of fixed blades mounted on said body, a movable blade pivotally mounted on the body, a pair of operating arms pivotally secured together, means for securing said arms to said body in any one of a number of different angular positions with respect thereto, and an adjustable swivel connection between one of said arms and the movable blade.

7. A trimmer as described comprising a supporting body, said body having two sets of openings therein, a pair of cutting blades each having a pin for engagement in one of the holes of the series, means for securing the blades to the body so that the pins thereof may engage any desired hole of the sets, a plurality of fixed blades detachably secured to the body, a movable blade, and means connected to the body and to the movable blade for oscillating the movable blade.

8. A trimmer as described comprising a supporting body, said body having two sets of openings therein, a pair of cutting blades each having a pin for engagement in one of the holes of the series, means for securing the blades to the body so that the pins thereof may engage any desired hole of the sets, a movable blade, and means connected to the body and to the movable blade for oscillating the movable blade.

9. A trimmer as described comprising a supporting body, a pair of angularly adjustable blades mounted thereon, an oscillatable blade mounted thereon, a pair of operating arms pivotally secured to the body, and means interconnecting the movable blade and the arms whereby the movable blade is given two complete oscillations over the fixed blades for one movement of the operating arms in either direction.

10. A trimmer as described comprising a supporting body, a pair of blades adjustably secured thereon, an oscillatable blade mounted thereon, a pair of operating arms pivotally secured to the body, means interconnecting the movable blade and the arms whereby the movable blade is given two complete oscillations over the fixed blades for one movement of the operating arms in either direction, and resilient means for aiding the movement of the movable blade in one direction.

11. A trimmer as described comprising a supporting body, a pair of pivotally connected operating arms secured to said body, a pair of angularly adjustable fixed blades mounted on said body, a movable blade mounted on said body, and means interconnecting said arms with said movable blade whereby it may be operated with respect to the fixed blades.

12. A trimmer as described comprising a supporting body, a pair of pivotally connected operating arms secured to said body, a pair of angularly adjustable fixed blades mounted on said body, a movable blade mounted on said body, and adjustable swivel means interconnecting said arms with said movable blade whereby it may be operated with respect to the fixed blades.

13. A trimmer as described comprising a supporting body, a pair of operating arms pivotally connected to said body and to each other, a pair of outer blades on said body angularly adjustable with respect to each other, at least one additional blade detachably mounted on said body, a movable blade pivotally mounted on said body, and means for connecting the movable blade to said arms.

14. A trimmer as described comprising a supporting body, a pair of operating arms pivotally connected to said body and to each other, a pair of outer blades on said body angularly adjustable with respect to each other, a removable bracket secured to said body having at least an additional blade secured thereon to lie between the adjustable blades, a movable blade pivotally mounted on the body to move over the other blades, and means for connecting the movable blade to the operating arms.

CHESTER A. BROWN.